United States Patent
Lynas et al.

[15] 3,641,550
[45] Feb. 8, 1972

[54] VIBRATION-MONITORING SYSTEMS

[72] Inventors: Derek L. Lynas; Walter G. Cross, both of Mickleover, England

[73] Assignee: Rolls Royce Limited, Derby, England

[22] Filed: Feb. 25, 1970

[21] Appl. No.: 13,940

[30] Foreign Application Priority Data

Mar. 5, 1969 Great Britain .................. 11,582/69

[52] U.S. Cl. .......................... 340/261, 73/67.2, 73/116
[51] Int. Cl. .......................................... G08b 19/00
[58] Field of Search .............. 340/261; 73/67.2, 116

[56] References Cited

UNITED STATES PATENTS 3,393,557 7/1968 Brown et al. .................... 73/67.2 X
3,400,578 9/1968 Frarey et al. ........................ 73/116

Primary Examiner—John W. Caldwell
Assistant Examiner—Michael Slobasky
Attorney—Cushman, Darby & Cushman

[57] ABSTRACT

A vibration-monitoring system for use with a three-shaft gas turbine engine. Vibration from the engine is picked up by two electrical transducers and transmitted to a filter network. The filters produce three electrical outputs in three separate frequency bands, each of which corresponds to the frequency band of the vibration produced by a respective one of the shafts. The vibration produced by each shaft can thus be separately indicated.

10 Claims, 1 Drawing Figure

PATENTED FEB 8 1972
3,641,550
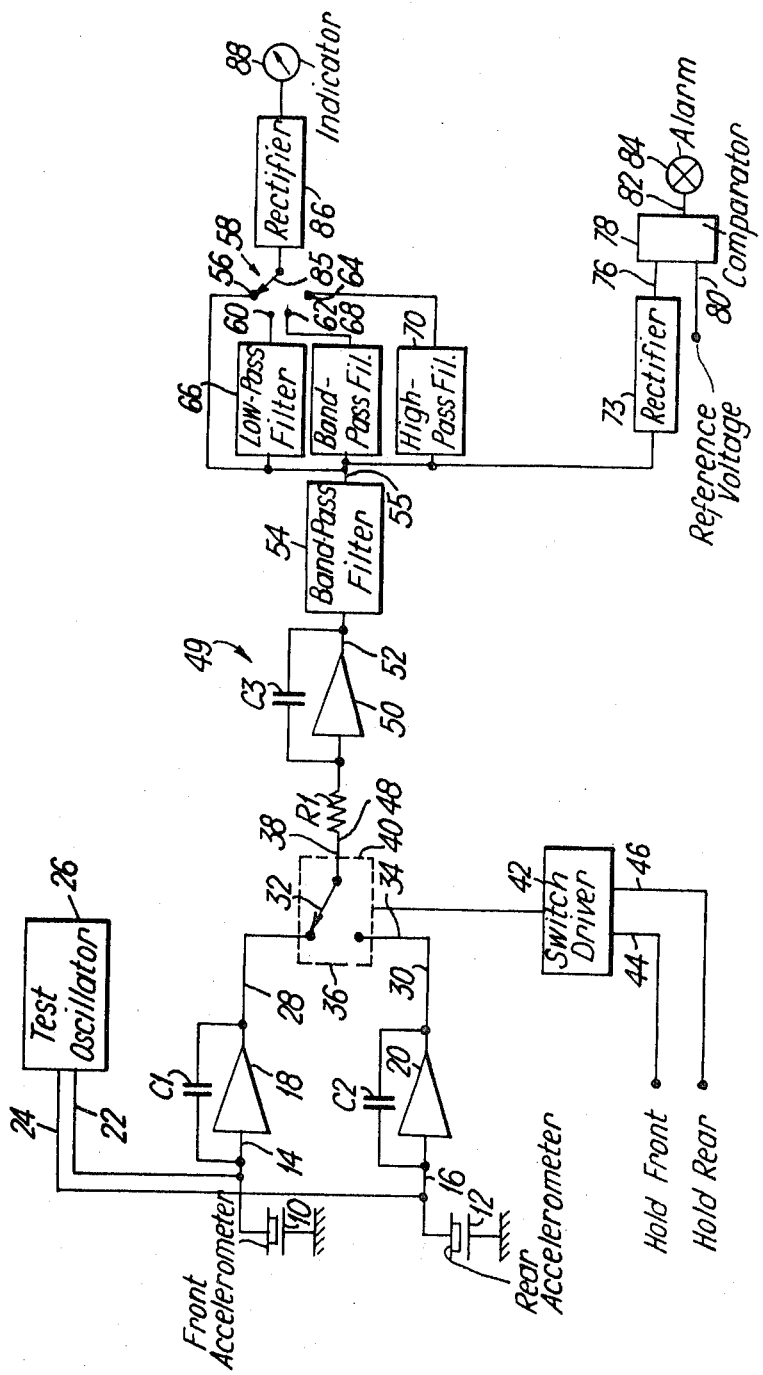
Inventor
DEREK L. LYNAS
WALTER G. CROSS
By
Cushman, Darby & Cushman
Attorneys

VIBRATION-MONITORING SYSTEMS

This invention relates to vibration-monitoring systems and is particularly, but not exclusively, concerned with a vibration-monitoring system for monitoring the vibration produced by a multishaft gas turbine engine in an aircraft.

In the past, vibration-monitoring systems for use with gas turbine engines comprised means for producing a single output signal indicative of the total amount of vibration produced by the engine in a frequency band which was wide enough to include most possible vibration frequencies produced by the engine throughout its full operating range. However, in multishaft gas turbine engines the amount of vibration contributed by each shaft to the total amount of vibration is not the same for each shaft. It is therefore possible that a significant change in the amount of vibration produced by, say, the HP shaft of the engine would either not produce a readily observable change in the total vibration or indeed be completely cancelled out by a far less significant change in the amount of vibration produced by the LP shaft. Failure to observe such a significant change can lead to continued operation of the engine with, say, an unbalanced HP rotor assembly, which in turn causes excessive bearing wear.

According to the present invention, therefore, a vibration-monitoring system comprises vibration-responsive means for producing an electrical signal whose frequency and amplitude are respectively dependent upon the frequency and amplitude of the vibration being monitored, filter means connected to receive the signal and adapted to transmit those components of the signal lying within a plurality of substantially nonoverlapping frequency bands to a corresponding number of respective outputs, and indicator means for indicating the total amount of vibration in each frequency band.

The vibration-monitoring system of the present invention can thus be used to separate the vibration being monitored into a number of discrete predetermined frequency bands.

In a preferred embodiment of the invention, particularly suitable for use with a three-shaft gas turbine engine, the filter means is adapted to transmit those components of the signal lying within three substantially nonoverlapping frequency bands.

The filter means preferably includes a first band-pass filter which is connected to receive the signal and which has upper and lower 3 db. frequencies which are respectively higher and lower than the highest and lowest frequencies of the vibration to be monitored.

Preferably the filter means further comprises a low-pass filter, a second band-pass filter and a high-pass filter whose respective inputs are connected to the output of the first band-pass filter and whose respective outputs constitute the three outputs of the filter means, whereby the lowest of the three frequency bands is defined between the lower 3 db. frequency of the first bandpass filter and the 3 db. frequency of the low-pass filter the intermediate one of the three frequency bands is defined between the upper and lower 3 db. frequencies of the second bandpass filter, and the highest of the three frequency bands is defined between the 3 db. frequency of the high-pass filter and the upper 3 db. frequency of the first bandpass filter.

The first band-pass filter may be provided with indicator means for indicating the total amount of vibration in its frequency band, which indicator means may be constituted by the first-mentioned indicator means.

The first-mentioned indicator means preferably comprises rectifying means selectively connectable to the respective outputs of the first band-pass filter, the low-pass filter, the second band-pass filter and the high-pass filter, and an indicator connected to the output of the rectifying means.

Preferably a warning device is connected to the output of the first band-pass filter via further rectifying means, whereby when the signal at the output of the further rectifying means exceeds a predetermined value the warning device is operated.

The warning device may produce a visible or audible warning.

The vibration-responsive means preferably comprises at least one accelerometer device.

In a preferred embodiment of the invention, the vibration-responsive means comprises two accelerometer devices, which are preferably piezo-electric crystal devices.

The outputs of the two accelerometer devices are preferably connected to the filter means via a two-state switching device having two inputs a single output and means for selectively connecting either of the inputs to the output.

The switching device is preferably provided with switch driving means for driving it between its two states at a predetermined frequency.

The invention also comprises a gas turbine engine provided with a vibration monitoring system in accordance with any of the preceding statements of invention, and an aircraft provided with such a gas turbine engine.

The invention will now be particularly described, by way of nonlimitative example only, with reference to the accompanying drawing, which is a schematic block diagram of a vibration monitoring system in accordance with the present invention.

The vibration monitoring system shown in the drawing is particularly suitable for use with a three-shaft gas turbine engine in an aircraft, and comprises two piezo-electric crystal accelerometer devices 10, 12 adapted to be secured to the engine casing (not shown) adjacent the front and rear parts thereof respectively. The outputs of the crystal devices 10, 12, which are essentially capacitive devices, are connected to the respective inputs 14, 16 of two high gain amplifiers 18, 20 having respective feedback capacitors C1 and C2. The amplifiers 18, 20 and their respective capacitors C1, C2 thus act as charge amplifiers to amplify the charge flowing to and from the crystal devices 10, 12 as a result of the engine vibration to which they are subjected.

The inputs 14, 16 of the amplifiers 18, 20 are also connected to respective outputs 22, 24 of a variable frequency test oscillator 26.

The outputs 28, 30 of the amplifiers 18, 20 are respectively connected to the inputs 32, 34 of a two-state switching device 36 having a single output 38 which may be selectively connected to either of the inputs 32, 34. The switching device 36 may comprise a changeover relay 40 (as indicated somewhat diagrammatically in the drawing) or solid-state switching circuitry, and is normally driven between its two states at a typical frequency of 1 c./s. by a switch driving circuit 42. The switch driving circuit 42 may be a simple multivibrator circuit and is provided with two "hold" inputs 44, 46 whereby the switching device 36 may be held in either of its two states if desired.

The output 38 of the switching device 36 is connected to the input 48 of an integrating amplifier 49 constituted by a high-gain amplifier 50 having an input resistor R1 and a feedback capacitor C3. The output 52 of the integrating amplifier 49 is connected to the input of a broad band band-pass filter 54 having a lower 3 db. frequency (typically 13 c./s.) which is sufficiently low to substantially include the lowest frequencies produced by vibration of the lowest-speed shaft of the engine but high enough to substantially exclude low-frequency vibrations produced by, for example, the airframe of the aircraft, and having an upper 3 db. frequency (typically 400 c./s.) which is high enough to substantially include the highest frequencies produced by vibration of the highest-speed shaft of the engine but low enough to substantially exclude high-frequency vibrations produced by, for example, the passage of individual blades of a rotor of the engine.

The output 55 of the bandpass filter 54 is directly connected to one contact 56 of a four-position switch 58 and is respectively connected to the other three contacts 60, 62, 64 via a low-pass filter 66 having a 3 db. frequency of, typically, 80 c./s., a bandpass filter 68 having upper and lower 3 db. frequencies of typically, 80 c./s. and 120 c./s. respectively, and a high-pass filter 70 having a 3 db. frequency of, typically, 140 c./s. The filters 54, 66, 68 and 70 are preferably designed so that each has a frequency rolloff of not less than 30 db. per octave.

It will thus be appreciated that electrical signals in the frequency band 13–400 c./s. appear at the contact 56, signals in the frequency band 13–80 c./s. appear at the contact 60, signals in the frequency band 80–120 c./s. appear at the contact 62 and signals in the frequency band 140–400 c./s. appear at the contact 64, the signals at the contacts 60, 62, 64 lying in substantially nonoverlapping frequency bands.

These three particular frequency bands are chosen so that at least over the operating range of the engine from cruise conditions to takeoff conditions the vibrations produced by the LP shaft lie mainly in the lowest frequency band, the vibrations produced by the IP shaft lie mainly in the intermediate frequency band and the vibrations produced by the HP shaft lie mainly in the highest frequency band. It will be appreciated, however, that any number of appropriate frequency bands may be chosen to suit a particular application.

The output 55 of the bandpass filter 54 is also connected, via a rectifying circuit 73 having a time constant of about 2 seconds, to one input 76 of a comparator 78. The other input 80 of the comparator 78 is connected to receive an adjustable reference voltage, while the output 82 thereof is connected to a warning light 84.

The wiper 85 of the switch 58 is connected, via a further rectifying circuit 86 having a time constant of about 2 seconds, to an indicator 88.

In normal operation, the wiper 85 of the switch 58 is set to the contact 56 and the switch driving circuit 42 is set to its 1 c./s. driving mode. Engine and other vibration causes each of the crystal devices 10, 12 to produce an electrical signal whose frequency and amplitude are respectively dependent upon the frequency and amplitude of the vibration, and these signals are amplified in the respective charge amplifiers constituted by the amplifiers 18, 20 and their capacitors C1, C2. The amplifier signals from the charge amplifiers are alternately passed to the integrating amplifier 49 by the switching device 36, so that the amplifier 49 receives the amplified signal from the crystal device 10 every alternate half second and the amplified signal from the crystal device 12 for the remainder of the time. The amplified signals from the crystal devices 10, 12 are combined in this way since it is possible for them to be in antiphase, so that if they were merely added together some cancellation could occur.

The amplified signal from the amplifier 49 passes to the bandpass filter 54 which transmits substantially only those components of the signal in the frequency range 13–400 c./s. as hereinbefore described, and the transmitted components pass to and are rectified in the rectifying circuit 86. The rectified signal from the rectifying circuit 86 thus represents an average value of the signals form the crystal devices 10, 12, and passes to and is indicated by the indicator 88, which therefore indicates the total vibration produced by the engine including all three shafts, in the frequency range of the filter 54.

The signal transmitted by the bandpass filter 54 also passes to and is rectified in the rectifying circuit 73. The reference voltage at the input 80 of the comparator 78 is adjusted so that when the output of the rectifying circuit 73 reaches a value which indicates that the amount of vibration produced by the engine is so high that the pilot of the aircraft must take action, for example when a large compressor or fan blade becomes detached, the comparator 78 energizes the warning light 84.

When it is desired to monitor the vibration produced mainly by a particular one of the shafts of the engine, the wiper 85 of the switch 58 is moved to the appropriate one of the contacts 60, 62, 64 and the amount of vibration is read on the indicator 88. These readings are preferably taken at regular intervals under the same engine operating conditions, thus enabling gradual changes in the vibration levels of individual shafts to be detected early and the appropriate remedial action to be taken.

The satisfactory operation of the circuitry of the vibration measuring system may be periodically checked by injecting signals of known frequency and an amplitude by means of the test oscillator 26.

It will be appreciated that many variations of the vibration monitoring system of the present invention are possible. Thus different types of accelerometer device, e.g., moving coil devices, may be used, either singly or in pairs, while each of the channels defined by the filters 66, 68, 70, may be provided with its own rectifying circuit and indicator, and if desired its own comparator and warning device. Additionally, the filters 66, 68, 70 may be replaced by three suitable bandpass filters or indeed by a larger or smaller number of suitably arranged filters, while the warning light 84 may be replaced by an audible or other suitable warning device.

It will also be appreciated that the vibration monitoring system of the present invention is suitable for use with machinery and apparatus, other than gas turbine engines, where it is desired to discriminate between different sources of vibration.

We claim:

1. A multishaft gas turbine engine shaft vibration-monitoring system comprising:
   two vibration-responsive devices,
   means mounting said two vibration-responsive devices on said gas turbine engine in spaced-apart relationship,
   said vibration-responsive devices each being disposed for producing an electrical signal having frequency and amplitude respectively dependent upon the frequency and amplitude of the vibrations being monitored,
   means for receiving both said electrical signals and producing a single first signal representing both said electrical signals,
   first filter means connected to receive said first signal for passing a second signal comprising those components of the first signal lying within a predetermined broad frequency band,
   a plurality of second filter means, the number of second filter means being equal to the number of shafts in said engine,
   each of said second filter means being effective for receiving said second signal and producing a third signal therefrom comprising those components of the second signal lying within a predetermined narrow frequency band, the narrow frequency bands associated with the second filter means being in nonoverlapping relationship,
   warning means associated with said first filter means for operation when the magnitude of said second signal exceeds a predetermined value,
   indicator means and selector means for selectively connecting said second signal and each of said third signals to said indicator means whereby the magnitude of vibration in said broad frequency band and in each said narrow frequency band may be selectively indicated.

2. A multishaft gas turbine engine shaft vibration monitoring system as in claim 1 wherein the first filter means comprises a first band-pass filter which is connected to receive the first signal and which is connected to receive the first signal and which has upper and lower 3 db. frequencies which are substantially equal to the highest and lowest frequencies respectively of the range of vibrations to be monitored.

3. A multishaft gas turbine engine shaft vibration monitoring system as in claim 2, wherein the plurality of second filter means comprises:
   a low-pass filter,
   a second band-pass filter, and
   a high-pass filter,
   the respective inputs of these filters being connected to the output of the first band-pass filter and the respective outputs of which constitute the three outputs of the second filter means, whereby the lowest of the three frequency bands is defined as being between the lower 3 db. frequency of the first band-pass filter and the 3 db. frequency of the low-pass filter, the intermediate one of the three frequency bands is defined as being between the upper and lower 3 db. frequencies of the second band-pass filter, and the highest of the three frequency bands is defined as being between the 3 db. frequency of the high-pass filter and the upper 3 db. frequency of the first band-pass filter.

4. A multishaft gas turbine engine shaft vibration monitoring system as in claim 3, wherein the indicator means comprises:
rectifying means selectively connectable to the respective outputs of the first band-pass filter, the low-pass filter, the second band-pass filter and the high-pass filter, and
an indicator connected to the output of the rectifying means.

5. A multishaft gas turbine engine shaft vibration-monitoring system as in claim 2, wherein a warning device is connected to the output of the first band-pass filter via further rectifying means, whereby when the signal at the output of the further rectifying means exceeds a predetermined value the warning device is operated.

6. A multishaft gas turbine engine shaft vibration-monitoring system as claimed in claim 5, wherein the warning device includes means for producing a visible warning.

7. A multishaft gas turbine engine shaft vibration-monitoring system as in claim 1 wherein each vibration-responsive device comprises an accelerometer device.

8. A multishaft gas turbine engine shaft vibration-monitoring system as in claim 7, wherein each accelerometer device is a piezoelectric crystal device.

9. A multishaft gas turbine engine shaft vibration-monitoring system as in claim 7, wherein the outputs of the two accelerometer devices are connected to the first filter means via a two-state switching device having two inputs, a single output and means for selectively connecting either of the inputs to the output.

10. A multishaft gas turbine engine shaft vibration-monitoring system as in claim 9, wherein the switching device is provided with switch driving means for driving it between its two states at a predetermined frequency.

* * * * *